United States Patent
Alsharif et al.

(10) Patent No.: US 10,878,319 B2
(45) Date of Patent: Dec. 29, 2020

(54) COMPRESSED RECURRENT NEURAL NETWORK MODELS

(71) Applicant: Google LLC, Mountain View, CA (US)

(72) Inventors: Ouais Alsharif, Mountain View, CA (US); Rohit Prakash Prabhavalkar, Santa Clara, CA (US); Ian C. McGraw, Menlo Park, CA (US); Antoine Jean Bruguier, Milpitas, CA (US)

(73) Assignee: Google LLC, Mountain View, CA (US)

( * ) Notice: Subject to any disclaimer, the term of this patent is extended or adjusted under 35 U.S.C. 154(b) by 950 days.

(21) Appl. No.: 15/394,617

(22) Filed: Dec. 29, 2016

(65) Prior Publication Data
US 2017/0220925 A1 Aug. 3, 2017

Related U.S. Application Data

(60) Provisional application No. 62/290,624, filed on Feb. 3, 2016.

(51) Int. Cl.
*G06N 3/08* (2006.01)
*G06F 17/16* (2006.01)
*G06N 3/04* (2006.01)

(52) U.S. Cl.
CPC ..... *G06N 3/08* (2013.01); *G05B 2219/33025* (2013.01); *G05B 2219/40326* (2013.01); *G06F 17/16* (2013.01); *G06N 3/0445* (2013.01)

(58) Field of Classification Search
CPC .................. G06N 3/0445; G06N 3/08; G05B 2219/33025; G05B 2219/40326; G06F 17/16

(Continued)

(56) References Cited

U.S. PATENT DOCUMENTS 8,874,496 B2 * 10/2014 Lazar .................. G06N 3/08 706/16
10,078,794 B2 * 9/2018 Pierce .................. G06K 9/4671
(Continued)

FOREIGN PATENT DOCUMENTS

CN 104598972 A * 5/2015
CN 105184369 A * 12/2015

OTHER PUBLICATIONS

Hayashi et al., "A Recurrent Probabilistic Neural Network with Dimensionality Reduction Based on Time-series Discriminant Component Analysis" Dec. 2015, IEEE Transactions on Neural Networks and Learning Systems, vol. 26, No. 12, pp. 3021-3033. (Year: 2015).*

(Continued)

*Primary Examiner* — Miranda M Huang
*Assistant Examiner* — Chase P. Hinckley
(74) *Attorney, Agent, or Firm* — Honigman LLP; Brett A. Krueger; Grant Griffith

(57) ABSTRACT

Methods, systems, and apparatus, including computer programs encoded on computer storage media, for implementing a compressed recurrent neural network (RNN). One of the systems includes a compressed RNN, the compressed RNN comprising a plurality of recurrent layers, wherein each of the recurrent layers has a respective recurrent weight matrix and a respective inter-layer weight matrix, and wherein at least one of recurrent layers is compressed such that a respective recurrent weight matrix of the compressed layer is defined by a first compressed weight matrix and a projection matrix and a respective inter-layer weight matrix of the compressed layer is defined by a second compressed weight matrix and the projection matrix.

15 Claims, 3 Drawing Sheets

(58) Field of Classification Search
USPC .......................................................... 706/25
See application file for complete search history.

(56) References Cited

U.S. PATENT DOCUMENTS

| | | | | |
|---|---|---|---|---|
| 2004/0015459 | A1* | 1/2004 | Jaeger | G06N 3/08 706/15 |
| 2012/0254086 | A1* | 10/2012 | Deng | G06N 3/0454 706/25 |
| 2014/0067735 | A1* | 3/2014 | Yu | G06N 3/02 706/20 |
| 2014/0156575 | A1* | 6/2014 | Sainath | G06N 7/005 706/16 |
| 2014/0229158 | A1* | 8/2014 | Zweig | G06N 3/08 704/9 |
| 2015/0170020 | A1* | 6/2015 | Garimella | G06N 3/082 706/14 |
| 2015/0227802 | A1* | 8/2015 | Anderson | G06K 9/00288 382/157 |
| 2015/0242180 | A1* | 8/2015 | Boulanger-Lewandowski | G06N 3/0445 700/94 |
| 2016/0217369 | A1* | 7/2016 | Annapureddy | G06N 3/082 |
| 2016/0307095 | A1* | 10/2016 | Li | G06N 3/08 |
| 2016/0328644 | A1* | 11/2016 | Lin | G06N 3/084 |
| 2017/0083623 | A1* | 3/2017 | Habibian | G06F 16/334 |
| 2017/0127016 | A1* | 5/2017 | Yu | G06N 3/0445 |
| 2017/0150235 | A1* | 5/2017 | Mei | H04N 21/8405 |
| 2017/0154425 | A1* | 6/2017 | Pierce | G06T 7/73 |

OTHER PUBLICATIONS

Zhou et al., "Compression of Fully-Connected Layer in Neural Network by Kronecker Product" Jul. 22, 2015, pp. 1-11. (Year: 2015).*

Li et al., "FPGA Acceleration of Recurrent Neural Network based Language Model" May 2-6, 2015, IEEE 23rd Annual International Symposium on Field-Programmable Custom Computing Machines, pp. 111-118. (Year: 2015).*

Vinyals, Oriol, "Beyond Deep Learning: Scalable Methods and Models for Learning" Fall 2013, Doctoral Dissertation, University of California, Berkeley, pp. i-97. (Year: 2013).*

Hu et al., "Incremental Tensor Subspace Learning and Its Applications to Foreground Segmentation and Tracking" Oct. 15, 2010, International Journal of Computer Vision, No. 91, pp. 303-327. (Year: 2010).*

Li et al., "Large Scale Recurrent Neural Network on GPU" Jul. 6-11, 2014, International Conference on Joint Neural Networks pp. 4062-4069. (Year: 2014).*

Sundermeyer et al., "From Feedforward to Recurrent LSTM Neural Networks for Language Modeling" Mar. 2015, IEEE/ACM Transactions on Audio, Speech, and Language Processing, vol. 23, No. 3, pp. 517-529. (Year: 2015).*

Arisoy et al., "Bidirectional Recurrent Neural Network Language Models for Automatic Speech Recognition" Apr. 19-24, 2015, IEEE International Conference on Acoustics, Speech, and Signal Processing, pp. 5421-5425. (Year: 2015).*

Bao et al., "Tensor Classification Network" Sep. 17-20, 2015, IEEE International Workshop on Machine Learning for Signal Processing. (Year: 2015).*

Cai et al., "A Combination of Multi-state Activation Functions, Mean-normalisation and Singular Value Decomposition for Learning Deep Neural Networks" Jul. 12-17, 2015, International Joint Conference on Neural Networks. (Year: 2015).*

Brockmeier, Austin J., "Learning and Exploiting Recurrent Patterns in Neural Data" 2014, Doctoral Dissertation, University of Florida, pp. i-196. (Year: 2014).*

Xia et al., "Sparse Projections for High-Dimensional Binary Codes" 2015. (Year: 2015).*

He et al., "Deep Residual Learning for Image Recognition" Dec. 10, 2015, pp. 1-12. (Year: 2015).*

Zhang et al., "Accelerating Very Deep Convolutional Networks for Classification and Detection" Nov. 20, 2015, IEEE. (Year: 2015).*

Zhang et al., "Efficient and Accurate Approximations of Nonlinear Convolutional Networks" Nov. 16, 2014. (Year: 2014).*

Jaeger, Herbert, "Controlling Recurrent Neural Networks by Conceptors" Mar. 13, 2014, pp. i-195. (Year: 2014).*

Ong, Hao Yi, "Value Function Approximation via Low Rank Models" Aug. 31, 2015. (Year: 2015).*

Yan et al., "Deep Correlation for Matching Images and Text" 2015, IEEE, pp. 3441-3450. (Year: 2015).*

International Preliminary Report on Patentability issued in International Application No. PCT/US2016/068913, dated Apr. 19, 2018, 22 pages.

Written Opinion issued in International Application No. PCT/US2016/068913, dated Jan. 15, 2018, 8 pages.

Prabhavalkar et al., "On the Compression of Recurrent Neural Networks with an Application to LVCSR Acoustic Modeling for Embedded Speech Recognition", May 2, 2016 [online] (retrieved from https://arxiv.org/pdf/1603.08042.pdf), 5 pages.

Sak et al., "Long Short-term Memory Recurrent Neural Network Architectures for Large Scale Acoustic Modeling", in Proc. of Interspeech, 2014, pp. 338-342.

International Search Report and Written Opinion in International Application No. PCT/US2016/068913, dated Mar. 27, 2017, 15 pages.

Sak et al. "Long Short-Term Memory Based Recurrent Neural Network Architectures for Large Vocabulary Speech Recognition", arXiv preprint arXiv 1402.1128v1, Feb. 5, 2014, 5 pages.

Blum et al. "Foundations of Data Science", Jan. 25, 2016, [retrieved on Apr. 28, 2017] Retrieved from Internet: URL<http://www/cs/corness/edu/jeh/bookjan25_2016.pdf, in http://www.archive.orgam Jan. 30, 2016, pp. 1-2, 22-23 and 35-60.

Gu et al. "Recent Advances in Convolutional Neural Networks", arXiv preprint arXiv 1512.07108v1, Dec. 22, 2015, 14 pages.

'https://deeplearning4j.org/lstm.html' [online] "DL4J Deep Learning for JAVA: A Beginner's Guide to Recurrent Networks and LSTMs", [retrieved on Apr. 30, 2017] Retrieved from Internet URL<https://deeplearning4j.org/lstm.html> 12 pages.

JP Office Action in Japanese Appln. No. 2018-534819, dated Sep. 24, 2019, 9 pages (with English translation).

* cited by examiner

COMPRESSED RECURRENT NEURAL NETWORK MODELS

CROSS-REFERENCE TO RELATED APPLICATION

This application claims priority to U.S. Provisional Application No. 62/290,624, filed on Feb. 3, 2016. The disclosure of the prior application is considered part of and is incorporated by reference in the disclosure of this application.

BACKGROUND

This specification relates to neural network architectures and compressing neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Some neural networks, e.g., those that are designed for time series problems or sequence-to-sequence learning (recurrent neural networks (RNNs)), incorporate recurrent loops which permit memory, in the form of a hidden state variable, to persist within a layer between data inputs. A variation of RNNs, long short-term memory (LSTM) neural networks include multiple gates within each layer to control the persistence of data between data inputs. Some neural networks, e.g., those that are designed for time series problems or sequence-to-sequence learning, incorporate recurrent loops which permit memory, in the form of a hidden state variable, to persist within a layer between data inputs.

SUMMARY

This specification describes technologies that relate to recurrent neural network architectures. In general, a recurrent neural network includes at least one recurrent neural network layer that is compressed. In particular, the recurrent weight matrix and the inter-layer weight matrix for the compressed recurrent layer are jointly compressed using a shared projection matrix.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By compressing the weight matrices of one or more of the recurrent layers in a recurrent neural network, the recurrent neural network is configured to be able to process data more efficiently and use less data storage. In particular, a recurrent neural network having one or compressed recurrent layers can be effectively trained to achieve performance that is comparable to full size, e.g., uncompressed, recurrent neural networks, while using less data storage and being able to process inputs faster by virtue of the compressed weight matrices of the compressed recurrent layers having fewer parameters than the weight matrices of the corresponding layers in the uncompressed recurrent neural network. In fact, because the compressed recurrent neural network has a smaller computational footprint, the compressed network may be able to be effectively implemented to process inputs in real-time on a mobile device having limited storage and processing power even when the uncompressed network could not be run on the mobile device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
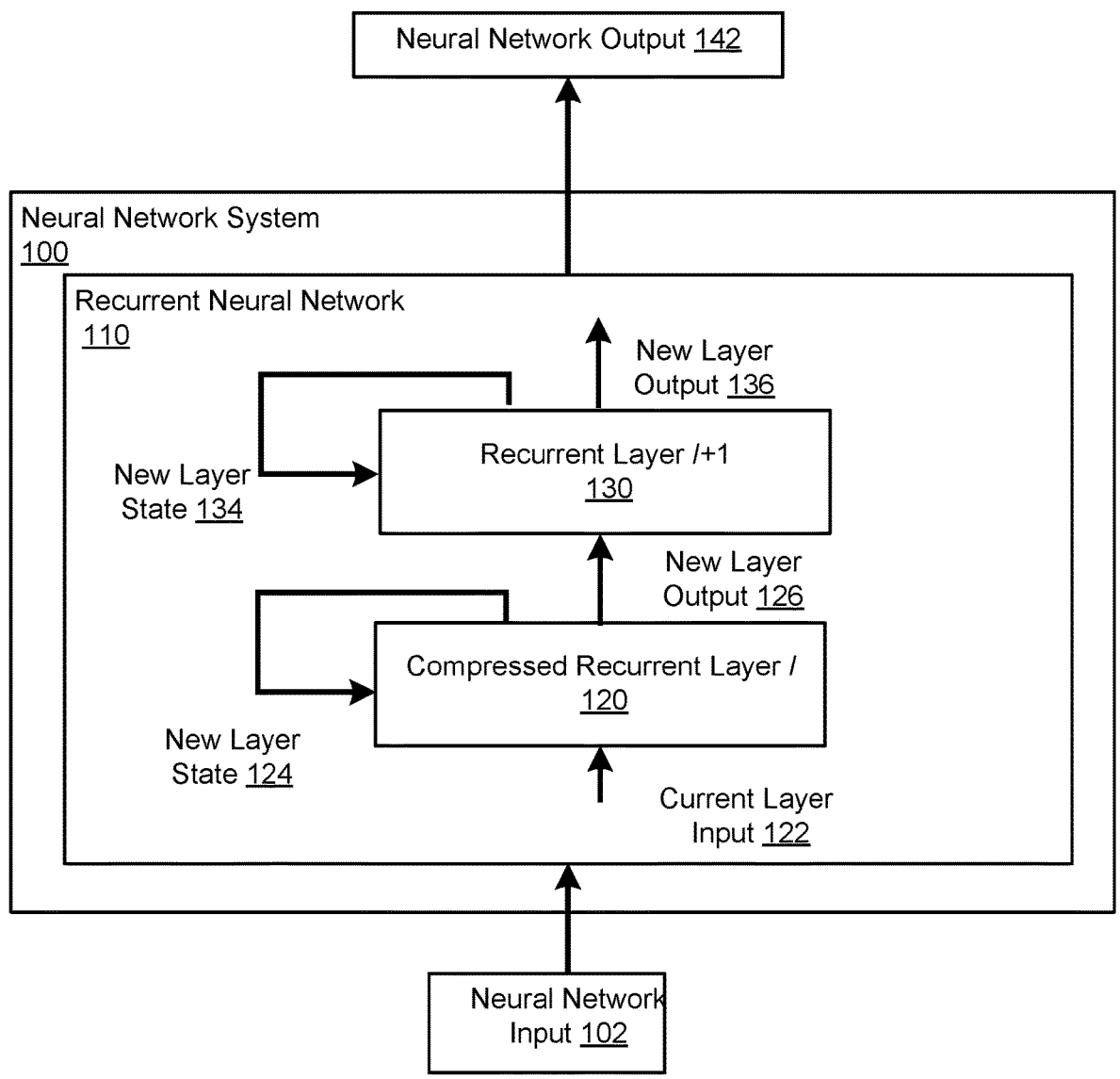
FIG. 1 shows an example neural network system.

FIG. 1 shows an example neural network system 100. The neural network system 100 is an example of a system implemented as computer programs on one or more computers in one or more locations, in which the systems, components, and techniques described below are implemented.

The neural network system 100 is a machine learning system that receives a respective neural network input at each of multiple time steps and generates a respective neural network output at each of the time steps. That is, at each of the multiple time steps, the neural network system 100 receives a neural network input and processes the neural network input to generate a neural network output. For example, at a given time step t, the neural network system 100 can receive a neural network input 102 and generate a neural network output 142.

The neural network system 100 can store the generated neural network outputs in an output data repository or provide the neural network outputs for use for some other immediate purpose.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item. In some of these examples, the neural network system 100 is part of a reinforcement learning system that provides content recommendations to users.

As another example, if the input to the neural network system 100 is text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is features of a spoken utterance, the output generated by the neural network system 100 may be a score for each of a set of pieces of text, each score representing an estimated likelihood that the piece of text is the correct transcription for the utterance.

As another example, if the inputs to the neural network system 100 are images, the output generated by the neural network system 100 may be a score for each of a set of pieces of text, each score representing an estimated likelihood that the piece of text is text that is present in the input image.

In particular, the neural network system 100 includes a recurrent neural network 110 which, in turn, includes multiple recurrent layers, i.e., at least a compressed recurrent layer l 120 and a recurrent layer l+1 130. The recurrent neural network 110 is configured to, at each of the time steps, receive the neural network input at the time step and to process the neural network input to generate the neural network output at the time step.

In addition to the compressed recurrent layer 120 and the recurrent layer 130, the recurrent neural network 110 may include one or more other components, e.g., other recurrent layers, other non-recurrent neural network layers, and so on.

For example, the recurrent neural network 100 may be a deep recurrent network that includes multiple recurrent layers including the compressed recurrent layer 120 and the recurrent layer 130 arranged in an ordered stack one on top of one another, and an output layer that, at each time step, receives the layer output from the highest recurrent layer in the stack and, optionally, other recurrent layers in the stack, and processes the layer output to generate the neural network output 142 at the time step.

The compressed recurrent layer 120 is configured to, at each of the time steps, receive a current layer input 122 and to process the current layer input 122, a current layer state of the recurrent layer 120, and a current layer output of the recurrent layer 120 to generate a new layer output 126 and to update the current layer state to generate a new layer state 124.

Depending on the configuration of the recurrent neural network 110, the current layer input 122 may be the neural network input 102 or an output generated by a different component of the recurrent neural network 110.

Additionally, for each time step after the first step, the current layer state is the new layer state generated at the preceding time step. For the first time step, the current layer state may be a predetermined initial layer state.

The recurrent layer 130 is configured to, at each of the time steps, receive the new layer output 126 and to process the new layer output 126 and a current layer state of the recurrent layer 130 to generate a new layer output 136 and to update the current layer state to generate a new layer state 134.

Depending on the configuration of the recurrent neural network 110, the new layer output 126 may be provided as input to another recurrent layer in the recurrent neural network 110, as input to a different type of neural network component, e.g., to an output layer or a different type of neural network layer, or may be provided as the neural network output 142 of the recurrent neural network 110.

Each recurrent layer in the recurrent neural network 110 has two corresponding weight matrices: a recurrent weight matrix and an inter-layer weight matrix. Generally, during processing at a given time step, the recurrent weight matrix for a given recurrent layer is applied to the layer output generated by the recurrent layer at the preceding time step while the inter-layer weight matrix is applied to layer outputs generated by the recurrent layer at the given time step. Thus, the recurrent weight matrix for a given recurrent layer will generally be applied by the given recurrent layer while the inter-layer weight matrix will generally be applied by the next layer that receives the layer output generated by the given recurrent layer at the time step, e.g., the next layer above the given layer in the stack.

In some implementations, the recurrent neural network 110 is a standard recurrent neural network and the state of each recurrent layer is therefore also used as the layer output of the recurrent layer. That is, the updated state of the layer for a given time step is also used as the layer output for the layer for the given time step. Thus, new layer output 136 is the same as new layer state 134 and new layer output 126 is the same as new layer state 124.

In these implementations, if neither of the compressed recurrent layer 120 or the recurrent layer 130 were compressed, the compressed recurrent layer 120 would be configured to generate a layer output $h_t^l$ 126 (and new layer state 124) at time step t that satisfied:

$$h_t^l = \sigma(W_x^{l-1} h_t^{l-1} + W_h^l h_{t-1}^l + b^l),$$

where $W_x^{l-1}$ is an inter-layer weight matrix for the layer before the layer 120 in the recurrent neural network 110, $h_t^{l-1}$ is the layer output of the layer before the layer 120, $W_h^l$ is the recurrent weight matrix for the uncompressed version of the recurrent layer 120, $h_{t-1}^l$ is the current layer state (and the layer output from the preceding time step), $b^l$ is the bias vector for the layer 120, and $\sigma(\cdot)$ denotes a non-linear activation function.

The recurrent layer 130 would be configured to generate a layer output $h_t^{l+1}$ 136 (and new layer state 134) at time step t that satisfies:

$$h_t^{l+1} = \sigma(W_x^l h_t^l + W_h^{l+1} h_{t-1}^{l+1} + b^{l+1}),$$

where $W_x^l$ is an inter-layer weight matrix for the uncompressed version of the layer 120, $h_t^l$ is the layer output 126 of the recurrent layer 120, $W_h^{l+1}$ is the recurrent weight matrix for the recurrent layer 130, $h_{t-1}^{l+1}$ is the current layer state (and the layer output from the preceding time step) for the recurrent layer 130, $b^{l+1}$ is the bias vector for the recurrent layer 130, and $\sigma(\cdot)$ denotes a non-linear activation function.

However, because at least the compressed recurrent layer 120 has been compressed, the inter-layer and recurrent weight matrices for the compressed recurrent layer 120 have been modified.

In particular, a compressed recurrent layer is a recurrent layer for which the recurrent and inter-layer matrices have each been replaced by a respective lower-rank approximation. That is, the recurrent weight matrix for the compressed recurrent layer has been replaced by a matrix that has a lower rank than the recurrent weight matrix and the inter-layer weight matrix has been replaced by a matrix that has a lower rank than the inter-layer weight matrix. In so doing, the number of parameters in the recurrent and inter-layer weight matrices have been reduced.

In particular, using the compression scheme described in this specification, the compressed recurrent layer 120 has been compressed by replacing the recurrent weight matrix, $W_h^l$, and inter-layer weight matrix, $W_x^l$, of the compressed layer 120 with respective first and second compressed weight matrices, $Z_h^l$, and $Z_x^l$, and a corresponding projection matrix, $P^l$. Specifically, the recurrent weight matrix, $W_h^l$, and inter-layer weight matrix, $W_x^l$, are jointly compressed by determining a projection matrix such that $W_h^l$ is defined by $Z_h^l P^l$ and $W_x^l$ is defined by $Z_x^l P^l$. The first and second compressed weight matrices and the projection matrix each have a rank that is lower than the rank of the inter-layer weight matrix and the recurrent weight matrix. Techniques for compressing a recurrent layer to reduce the number of parameters while maintaining high performance is described in more detail below with reference to FIG. 3.

Accordingly, after the compression, when the recurrent neural network 110 is a standard recurrent neural network, the layer output generated by the compressed recurrent layer 120 satisfies:

$$h_t^l = \sigma(W_x^{l-1} h_t^{l-1} + Z_h^l P^l h_{t-1}^l + b^l),$$

while the layer output generated by the recurrent layer 130 satisfies:

$$h_t^{l+1} = \sigma(Z_x^l P^l h_t^l + W_h^{l+1} h_{t-1}^{l+1} + b^{l+1}).$$

In some other implementations, the recurrent layers in the recurrent neural network 110 are long short-term memory (LSTM) layers and the state of a given LSTM layer and the layer output of the LSTM layer are different. To generate a layer output, a given LSTM layer applies multiple gates to the current layer input and the current layer state, to generate the new layer output and to update the current layer state to generate the new layer state. Thus, as part of generating a layer output, the LSTM will generally apply multiply different weight matrices to both the current layer input and the current layer state. The operation of LSTM layers is described in more detail in H. Sak, A. Senior, and F. Beaufays, "Long short-term memory recurrent neural network architectures for large scale acoustic modeling," in Proc. of Interspeech, 2014, pp. 338-342.

When the recurrent layers are LSTM layers, the recurrent weight matrix for a given LSTM layer can be considered to be the vertical concatenation of the weight matrices that the given LSTM layer applies to the current layer state. The inter-layer weight matrix for a given LSTM layer can be considered to be the vertical concatenation of the weight matrices that a next LSTM layer applies to the layer outputs generated by the given LSTM layer.

While in the example of FIG. 1 only the compressed recurrent layer 120 is compressed, in some cases more than one of the recurrent layers or even all of the recurrent layers in the recurrent neural network 110 can each be compressed as described below with reference to FIG. 3.

In some implementations, jointly compressing the recurrent weight matrix and the inter-layer weight matrix such that the projection matrix is shared across the recurrent and inter-layer weight matrices as described in this specification may allow for more efficient parameterization of the weight matrices. In some implementations, where the recurrent neural network 110 is a speech recognition model, the above described techniques may be used to compress the recurrent neural network 110 by at least 68% while achieving a word error rate that is within 5% of the uncompressed model.

Figure 2:
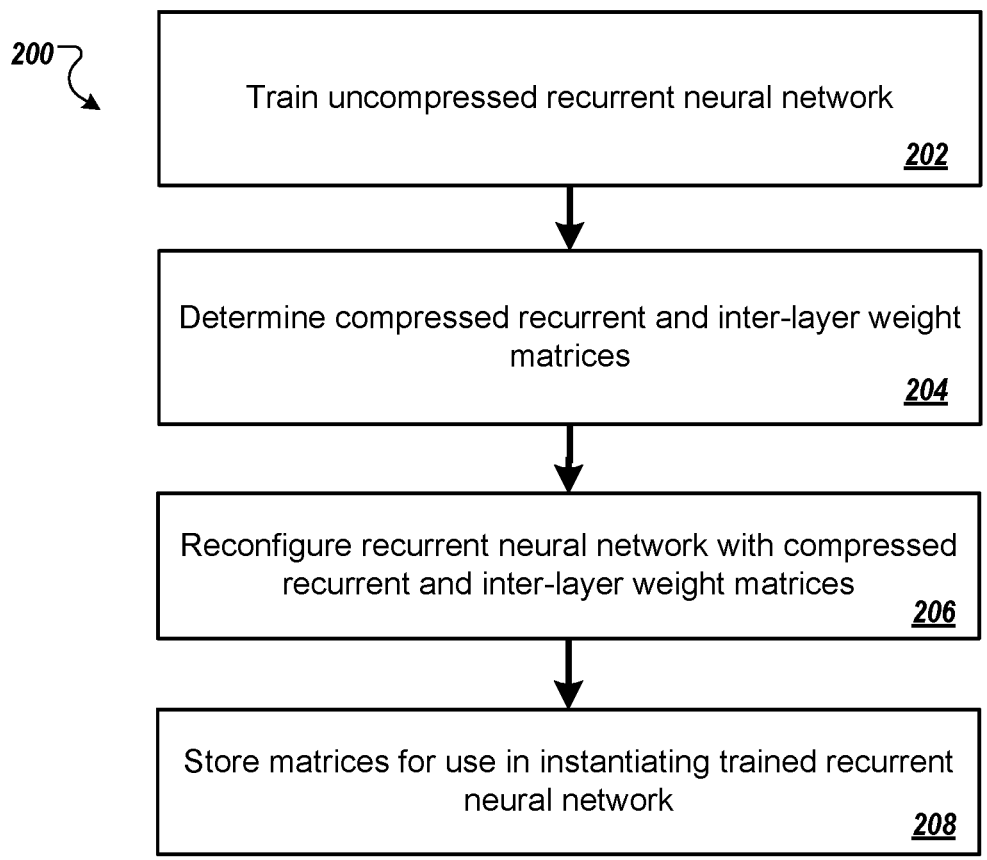
FIG. 2 is a flow diagram of an example process for compressing a recurrent neural network.

FIG. 2 is a flow diagram of an example process 200 for compressing a recurrent neural network. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system trains an uncompressed recurrent neural network on training data (step 202) to determine trained values of the parameters in the weight matrices of the layers of the uncompressed recurrent neural network. For example, the system can train the recurrent neural network 110 of FIG. 1 before any of the recurrent layers in the network have been compressed. The system can train the uncompressed recurrent neural network using conventional recurrent neural network training techniques, e.g., stochastic gradient descent with backpropagation through time.

The system compresses one or more of the recurrent layers in the recurrent neural network (step 204). In particular, for each recurrent layer that is to be compressed, the system generates a first compressed weight matrix, $Z_h^l$, and a projection matrix, $P^l$ so that the product of the first compressed weight matrix and the projection matrix approximates the recurrent weight matrix $W_h^l$ of the recurrent layer and generates a second compressed weight matrix, $Z_x^l$, based on the first compressed weight matrix, $Z_h^l$, and the projection matrix, $P^l$ so that the product of the second compressed weight matrix and the projection matrix approximates the inter-layer weight matrix of the recurrent layer. Compressing a particular recurrent layer is described in more detail below with reference to FIG. 3. Because the compression of a given layer depends only on the recurrent weight matrix and the inter-layer weight matrix of the layer, i.e., and not on the matrices of any other layers, the system can compress a single recurrent layer, multiple recurrent layers, or all of the recurrent layers in the recurrent neural network.

The system re-configures the recurrent neural network with the compressed weight matrices (step 206). That is, for each recurrent layer that was compressed, the system replaces the recurrent weight matrix for the layer with the product of the first compressed weight matrix and the projection matrix and the inter-layer weight matrix for the layer with the product of the second compressed weight matrix and the projection matrix. Because the product of the first compressed weight matrix and the projection matrix is of a lower rank than the recurrent weight matrix and the product of the second compressed weight matrix and the projection matrix the inter-layer weight matrix of the layer, the matrices include fewer parameters than their corresponding matrices in the uncompressed neural network.

Optionally, after re-configuring the recurrent neural network, the system can fine-tune the performance of the compressed neural network by training the re-configured neural network on additional training data to further adjust the trained values of the parameters while maintaining the ranks of the projection matrices and the compressed weight matrices, i.e., constraining the ranks of the projection matrices and the compressed weight matrices to not increase.

The system stores the weight matrices of the re-configured neural network for use in instantiating a trained neural network, i.e., a trained recurrent neural network that can effectively be used to process neural network inputs (step 208). In some cases, in addition to or instead of storing the weight matrices, the system can transmit the weight matrices and other data defining the configuration of the neural network to another system for use in implementing a trained recurrent neural network. For example, the system can transmit the configuration data to a mobile device to allow the compressed recurrent neural network to be implemented on the mobile device.

Figure 3:
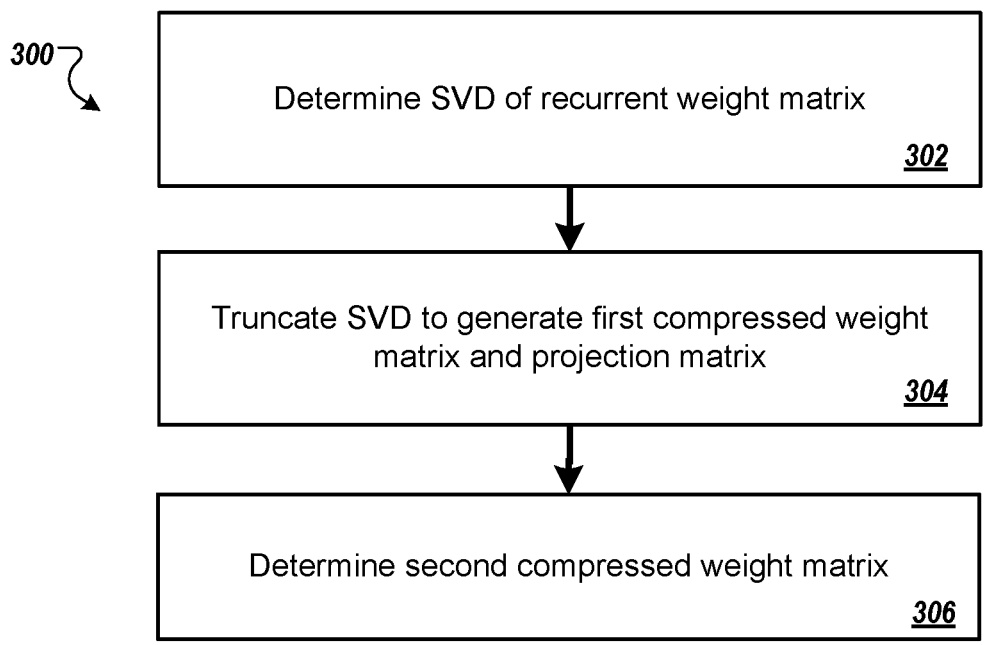
FIG. 3 is a flow diagram of an example process for compressing an inter-layer weight matrix and a recurrent weight matrix for a particular recurrent layer.

FIG. 3 is a flow diagram of an example process 300 for compressing an inter-layer weight matrix and a recurrent weight matrix for a particular recurrent layer. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system determines a singular value decomposition (SVD) of the recurrent weight matrix $W_h$ for the particular recurrent layer (step 302). The singular value decomposition of the recurrent weight matrix is a decomposition of the matrix $W_h$ into a first unitary matrix U, a rectangular diagonal matrix $\Sigma$, and a second unitary matrix V. In particular, the SVD satisfies:

$$W_h = U\Sigma V^T.$$

The system can determine the SVD of the recurrent weight matrix using a known SVD decomposition technique. For example, the system can first reduce the recurrent weight matrix to a bidiagonal matrix and then compute the SVD of the bidiagonal matrix using an iterative method, e.g., a variant of the QR algorithm.

The system truncates the SVD to generate the first compressed weight matrix $Z_h^l$ and the projection matrix $P^l$ (step 304). In particular, the system truncates the SVD by (i) retaining the top, i.e., highest, l values in the rectangular diagonal matrix $\Sigma$ and setting the remaining values to zero, (ii) retaining the top l values in each singular vector, i.e., column, of the first unitary matrix U and setting the remaining values to zero, and (iii) retaining the top l values in each singular vector, i.e., column, of the second unitary matrix V and setting the remaining values to zero.

Generally, l is a value that is less than the dimensionality of the weight matrices and that has been configured to control the degree of compression applied to the recurrent layer. That is, the smaller the value of l, the higher the degree of compression that is applied.

In some implementations, l is a predetermined value.

In some other implementations, the system determines l so that the truncated SVD retains at most a predetermined threshold fraction T of the explained variance in the SVD operation. In particular, the system can set l to be the value for which the ratio of (i) the sum of the squares of the top, i.e., highest, l values in the rectangular diagonal matrix $\Sigma$ to (ii) the sum of the squares of all of the values in the rectangular diagonal matrix $\Sigma$ is greatest while still being less than τ.

In these implementations, if the system is compressing multiple recurrent layers within the recurrent neural network, the value of l will likely differ between the multiple layers, i.e., because a different l will satisfy the above criteria for SVDs of different matrices.

Once the system has truncated the SVD to generate a truncated first unitary matrix $\tilde{U}$, a truncated rectangular diagonal matrix $\tilde{\Sigma}$, and a truncated second unitary matrix $\tilde{V}$, the system can set the first compressed weight matrix $Z_h^l$ equal to $\tilde{U}\tilde{\Sigma}$ and the projection matrix $P^l$ equal to $\tilde{V}^T$.

The system determines the second compressed weight matrix $Z_x^l$ from the first compressed weight matrix $Z_h^l$ and the projection matrix $P^l$ (step 306). In particular, the system determines the second compressed weight matrix by solving the following least-squares problem:

$$Z_X^1 = \arg\min_Y (\|YP^l - W_X^1\|_F^2),$$

where $\|X\|_F$ denotes the Frobenius norm of the matrix X. The system can solve the least-squares problem using conventional least-squares techniques, e.g., using a least-squares solver.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system comprising:
data processing hardware; and
memory hardware in communication with the data processing hardware and storing instructions that when executed on the data processing hardware cause the data processing hardware to perform operations comprising:

training an uncompressed version of a recurrent neural network (RNN) on training data to learn a respective recurrent weight matrix, $W_h$, and a respective inter-layer weight matrix, $W_x$, for each of a plurality of uncompressed recurrent layers of the uncompressed version of the RNN, each recurrent layer of the plurality of uncompressed recurrent layers configured to, for each of a plurality of time steps:
receive a respective layer input for the time step; and
process the respective layer input for the time step to generate a respective layer output for the time step;
re-configuring the trained RNN by, for at least one recurrent layer of the plurality of uncompressed recurrent layers of the uncompressed version of the trained RNN, compressing the recurrent layer by:
determining a respective singular value decomposition (SVD) of the respective recurrent weight matrix, $W_h$, for the recurrent layer;
generating a first compressed weight matrix, $Z_h^l$, and a projection matrix, $P^l$, based on the respective SVD of the respective recurrent weight matrix, $W_h$, for the recurrent layer;
generating a second compressed weight matrix, $Z_x^l$, based on the first compressed weight matrix, $Z_h^l$, and the projection matrix, $P^l$;
replacing the respective recurrent weight matrix, $W_h$, with the product of the first compressed weight matrix, $Z_h^l$, and the projection matrix, $P^l$; and
replacing the respective inter-layer weight matrix, $W_x$, with the product of the second compressed weight matrix, $Z_x^l$, and the projection matrix, $P^l$; and
transmitting the re-configured trained RNN having the at least one compressed recurrent layer to a mobile device in communication with the data processing hardware, the re-configured trained RNN having the at least one compressed recurrent layer configured to receive a respective neural network input at each of multiple time steps and generate a respective neural network output at each of the multiple time steps.

2. The system of claim 1, wherein each recurrent layer of the plurality of uncompressed recurrent layers is configured to, for each time step, generate the respective layer output for the time step by applying an inter-layer weight matrix, $W_x^{l-1}$, for a previous layer to a current input to the layer and applying the respective recurrent weight matrix, $W_h^l$, for the layer to a recurrent input to the layer.

3. The system of claim 1, further comprising, after compressing the at least one recurrent layer of the plurality of uncompressed recurrent layers, generating the respective layer output, for each time step, by applying the first compressed weight matrix, $Z_h^l$, and the projection matrix, $P^l$, to a respective recurrent input to the layer.

4. The system of claim 1, wherein the RNN comprises an acoustic model.

5. The system of claim 1, wherein the RNN comprises a speech recognition model.

6. The system of claim 1, wherein, after compressing the at least one recurrent layer of the plurality of uncompressed recurrent layers, the re-configured trained RNN comprises at least a 68% compression of the uncompressed version of the RNN prior to compressing the at least one recurrent layer of the plurality of uncompressed recurrent layers.

7. The system of claim 1, wherein, after compressing the at least one recurrent layer of the plurality of uncompressed recurrent layers, a word error rate of the re-configured trained RNN is within 5% of a word error rate of the uncompressed version of the RNN prior to compressing the at least one recurrent layer of the plurality of uncompressed recurrent layers.

8. A method for compressing a recurrent neural network (RNN), the method comprising:
training, by data processing hardware, an uncompressed version of a recurrent neural network (RNN) on training data to learn a respective recurrent weight matrix, $W_h$, and a respective inter-layer weight matrix, $W_x$, for each of a plurality of uncompressed recurrent layers of the uncompressed version of the RNN, each recurrent layer of the plurality of uncompressed recurrent layers configured to, for each of a plurality of time steps:
receive a respective layer input for the time step; and
process the respective layer input for the time step to generate a respective layer output for the time step;
re-configuring the trained RNN by, for at least one recurrent layer of the plurality of uncompressed recurrent layers of the uncompressed version of the trained RNN, compressing, by the data processing hardware, the recurrent layer by:
determining a respective singular value decomposition (SVD) of the respective recurrent weight matrix, $W_h$, for the recurrent layer;
generating a first compressed weight matrix, $Z_h^l$, and a projection matrix, $P^l$, based on the respective SVD of the respective recurrent weight matrix, $W_h$, for the recurrent layer;
generating a second compressed weight matrix, $Z_x^l$, based on the first compressed weight matrix, $Z_h^l$, and the projection matrix, $P^l$;
replacing the respective recurrent weight matrix, $W_h$, with the product of the first compressed weight matrix, $Z_h^l$, and the projection matrix, $P^l$; and
replacing the respective inter-layer weight matrix, $W_x$, with the product of the second compressed weight matrix, $Z_x^l$, and the projection matrix, $P^l$; and
transmitting, by the data processing hardware, the re-configured trained RNN having the at least one compressed recurrent layer to a mobile device in communication with the data processing hardware, the re-configured trained RNN having the at least one compressed recurrent layer configured to receive a respective neural network input at each of multiple time steps and generate a respective neural network output at each of the multiple time steps.

9. The method of claim 8, wherein the respective ranks of the first compressed weight matrix, $Z_h^l$, and the projection matrix, $P^l$, are less than the rank of the respective recurrent weight matrix, $W_h$, for the recurrent layer.

10. The method of claim 8, wherein the respective ranks of the second compressed weight matrix, $Z_x^l$, and the projection matrix, $P^l$, are less than the rank of the respective inter-layer weight matrix, $W_x$, for the recurrent layer.

11. The method of claim 8, wherein generating the second compressed weight matrix, $Z_x^l$, comprises inverting the projection matrix, $P^l$, and multiplying the inverted projection matrix by the respective inter-layer weight matrix, $W_x$, for the recurrent layer.

12. The method of claim 8, wherein the at least one recurrent layer of the plurality of uncompressed recurrent layers that is compressed comprises an l-th layer, and wherein the output for the l-th layer can be expressed by $h_t^l = \sigma(W_x^{l-1} + Z_h^l P^l h_{t-1}^l + b^l)$, wherein $h_t^l$ represents a hidden layer activation output of the l-th layer at time t, $W_x^{l-1}$ represents an inter-layer weight matrix from a previous, (l−1)-th, layer $b^l$ represents an l-th layer bias vector, and $\sigma(\bullet)$ denotes a non-linear activation function.

13. The method of claim 8, wherein the RNN comprises a long short-term memory (LSTM) RNN.

14. The method of claim 8, wherein the RNN comprises an acoustic model.

15. The method of claim 8, wherein the RNN comprises a speech recognition model.

\* \* \* \* \*